(12) United States Patent
Valette et al.

(10) Patent No.: US 9,276,395 B2
(45) Date of Patent: Mar. 1, 2016

(54) ELECTRIC CIRCUIT FOR CUTTING OFF AN ELECTRICAL SUPPLY WITH RELAY AND FUSES

(71) Applicant: SAGEM DEFENSE SECURITE, Boulogne-Billancourt (FR)

(72) Inventors: Patrick Valette, Boulogne-Billancourt (FR); Francois Guillot, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/409,462

(22) PCT Filed: Jun. 21, 2013

(86) PCT No.: PCT/EP2013/063040
§ 371 (c)(1),
(2) Date: Dec. 18, 2014

(87) PCT Pub. No.: WO2013/190109
PCT Pub. Date: Dec. 27, 2013

(65) Prior Publication Data
US 2015/0222108 A1      Aug. 6, 2015

(30) Foreign Application Priority Data
Jun. 21, 2012   (FR) ...................................... 12 55872

(51) Int. Cl.
*H02H 3/02* (2006.01)
*H02J 1/08* (2006.01)
*B64D 43/00* (2006.01)

(52) U.S. Cl.
CPC ................. *H02H 3/02* (2013.01); *B64D 43/00* (2013.01); *H02J 1/08* (2013.01); *B64D 2221/00* (2013.01)

(58) Field of Classification Search
CPC ..................................................... Y10T 307/76
USPC ................................................. 307/115, 326
See application file for complete search history.

(56) References Cited

U.S. PATENT DOCUMENTS 4,001,654 A * 1/1977 Davis ...................... F01D 21/20
                                                                        307/115
4,159,496 A * 6/1979 Stevens ................... A61G 7/018
                                                                        307/115

(Continued)

FOREIGN PATENT DOCUMENTS

FR              2 771 564 A1    5/1999
WO     WO 2008/113337 A2    9/2008

OTHER PUBLICATIONS

French Search Report issued for FR 1255872 on Nov. 26, 2012 with cover page with English translation (3 pages).

(Continued)

*Primary Examiner* — Fritz M Fleming
(74) *Attorney, Agent, or Firm* — Blakely Sokoloff Taylor & Zafman LLP

(57) ABSTRACT

The invention relates to an electrical circuit adapted for cutting off an electrical supply to an electrical equipment, said electrical circuit receiving as input at least two discrete electrical signals xi, i=1, N, the electrical circuit comprising: —a voltage source; —a number N>1 cutoff units Ui connected together, i=1, . . . , N in series between the voltage source and the electrical equipment, and a last cutoff unit $U_N$ being connected to the electrical equipment, each cutoff unit Ui exhibiting an open or closed state as a function of an electrical control signal; the cutoff units Uj, j=1, N−1 upstream of the last cutoff unit $U_N$ each being controlled by a distinct discrete electrical signal xj, j=1, . . . , N−1, the last cutoff unit being controlled as a function of the state of the cutoff units Uj, j=1, . . . , N−1 upstream and a discrete electrical signal $x_N$ different from that controlling the upstream cutoff units Uj, j=1, N−1.

9 Claims, 3 Drawing Sheets

(56) References Cited

U.S. PATENT DOCUMENTS

| | | | |
|---|---|---|---|
| 7,304,406 B2 * | 12/2007 | Behringer | H01H 47/005 307/326 |
| 8,203,234 B2 * | 6/2012 | Lee | H02J 7/0031 307/326 |
| 2005/0110526 A1 | 5/2005 | Ishibashi et al. | |

OTHER PUBLICATIONS

Written Opinion of the International Searching Authority issued for PCT/EP2013/063040 on Dec. 23, 2014 with English translation (12 pages).

* cited by examiner

ELECTRIC CIRCUIT FOR CUTTING OFF AN ELECTRICAL SUPPLY WITH RELAY AND FUSES

GENERAL TECHNICAL FIELD

The invention relates to the security field for controlling systems or equipment, especially electronic ones and more particularly those on board of an aircraft.

STATE OF THE ART

An electrical system can be controlled once a condition is checked.

A known solution is to connect the power supply of the electric system to an electric circuit configured to test discrete signals indicating that a condition is true.

For example, in the case of an aircraft, some of electrical equipment should be cut-off in flight, such as, in the case of avionic data acquisition, processing and communication system, the wireless transmission radio module has to be cut-off in order to avoid disturbing the aircraft functioning.

By means of logical gates AND connected to switches, it is possible to simply cutting off power of the radio module when necessary.

Such a solution is however not satisfactory when safety levels, particularly high are required. For instance, the levels of reliability needed to supply electrical equipment presenting catastrophic risk are around $10^{-9}$ per hour of use.

PRESENTATION OF THE INVENTION

The invention proposes to overcome at least one of these disadvantages.

For this purpose, the invention provides an electric circuit adapted to cut-off a power supply of an electric equipment, said circuit receiving as input at least two discrete electrical signals $x_i$, $i=1$, N, the electric circuit comprising:
  a voltage source;
  a number $N>1$ of cut-off units $U_i$, $i=1, \ldots, N$ connected in series to each other between the voltage source and the electric equipment, a last cut-off unit $U_N$ being connected to the electrical equipment, each cut-off unit $U_i$ having an open or closed state depending on an electric control signal;
  the cut-off units $U_j$, $j=1$, N-1 upstream of the last cut-off unit $U_N$ being each controlled by a distinct discrete electrical signal $x_j$, $j=1, \ldots, N-1$, the last cut-off unit being controlled as a function of the state of the cut-off units $U_j$, $j=1, \ldots, N-1$ upstream and a discrete electrical signal $x_N$ different from that controlling the upstream cut-off units $U_j$, $j=1$, N-1.

The invention is advantageously completed by the following characteristics, taken alone or in any technically possible combination:
  the last cut-off unit is controlled to isolate the electrical equipment once the upstream cut-off units of the last cut-off unit have a divergent state;
  the last cut-off unit is adapted to generate a short circuit when said last cut-off unit is in the closed state;
  the last cut-off unit is connected to a ground line to generate the short circuit;
  it comprises at least one fuse, in case of short circuit, to isolate the voltage source from the elements of said electric circuit;
  each cut-off unit comprises an upper path and a lower path, each path comprising a switch having an "open" state or a "closed" state;
  the upper paths of the cut-off units, upstream of the last cut-off unit, are connected in reverse manner;
  the cut-off units are electromechanical relay;
  the last cut-off unit is controlled by a logic function AND regarding the state of the upstream cut-off units and by the control signal of the $N^{th}$ cut-off unit.

And the invention also relates to an avionic data acquisition, processing and communication system comprising a radio module comprising an electric power supply connected to an electric circuit according to the invention.

The circuit of the invention comprising several components, the safety level of circuit is in the order of $10^{-9}$ per hour of use. Furthermore, by using several stages that may interact according to their state ensures that the system is robust to failures that may affect components while enabling to supply the electrical equipment only in the case it should be.

PRESENTATION OF FIGURES

Other features, aims and advantages of the invention will appear from the following description, which is purely illustrative and non-limiting and should be read with reference to the appended drawings in which.

Among all these figures, the similar elements share identical references.

DETAILED DESCRIPTION OF THE INVENTION

Figure 1:
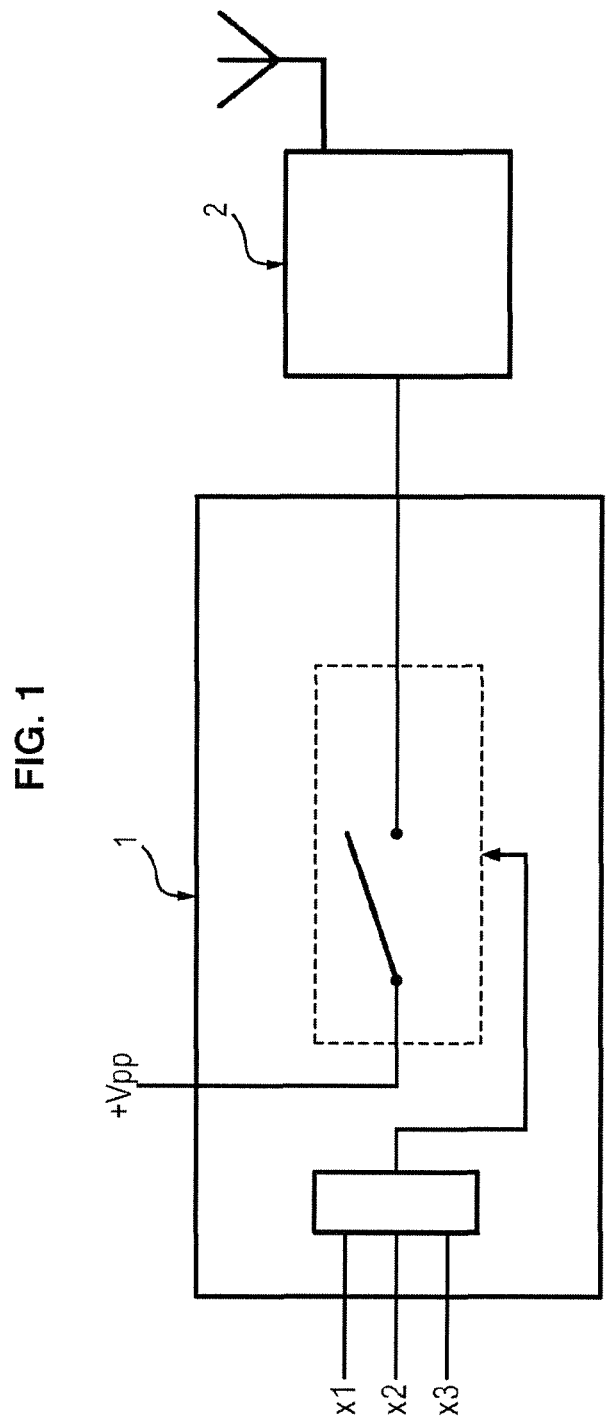
FIG. 1 illustrates an avionic data acquisition, processing and communication system in accordance with an embodiment of the invention.

In relation to FIG. 1, an avionic data acquisition, processing and communication system includes:
  an acquisition unit (not represented) of discrete electrical signals $x_1$, $x_2$, $x_3$ indicating a state of the aircraft;
  a radio module 2 adapted to transfer the avionic data of the system towards a remote station;
  a voltage power source +Vpp of the radio module 2, and
  a power electric circuit 1 of the radio module 2 which enables cutting off the power of the radio module when the aircraft is in flight.

A state of the aircraft is, for instance, in flight, on the ground, etc. When the aircraft is on the ground, the discrete electrical signals indicating that the aircraft has landed, are for example: a signal indicating the existence of a weight of the aircraft on the wheels, or a signal indicating that the doors of the aircraft are open.

The power electric circuit can be modeled by a switch controlled by a logic function of discrete electrical signals (see FIG. 1).

By logic function, we mean a series of operations related to one or more variables. The known logic functions are: AND, OR, XOR, etc.

Figure 2:
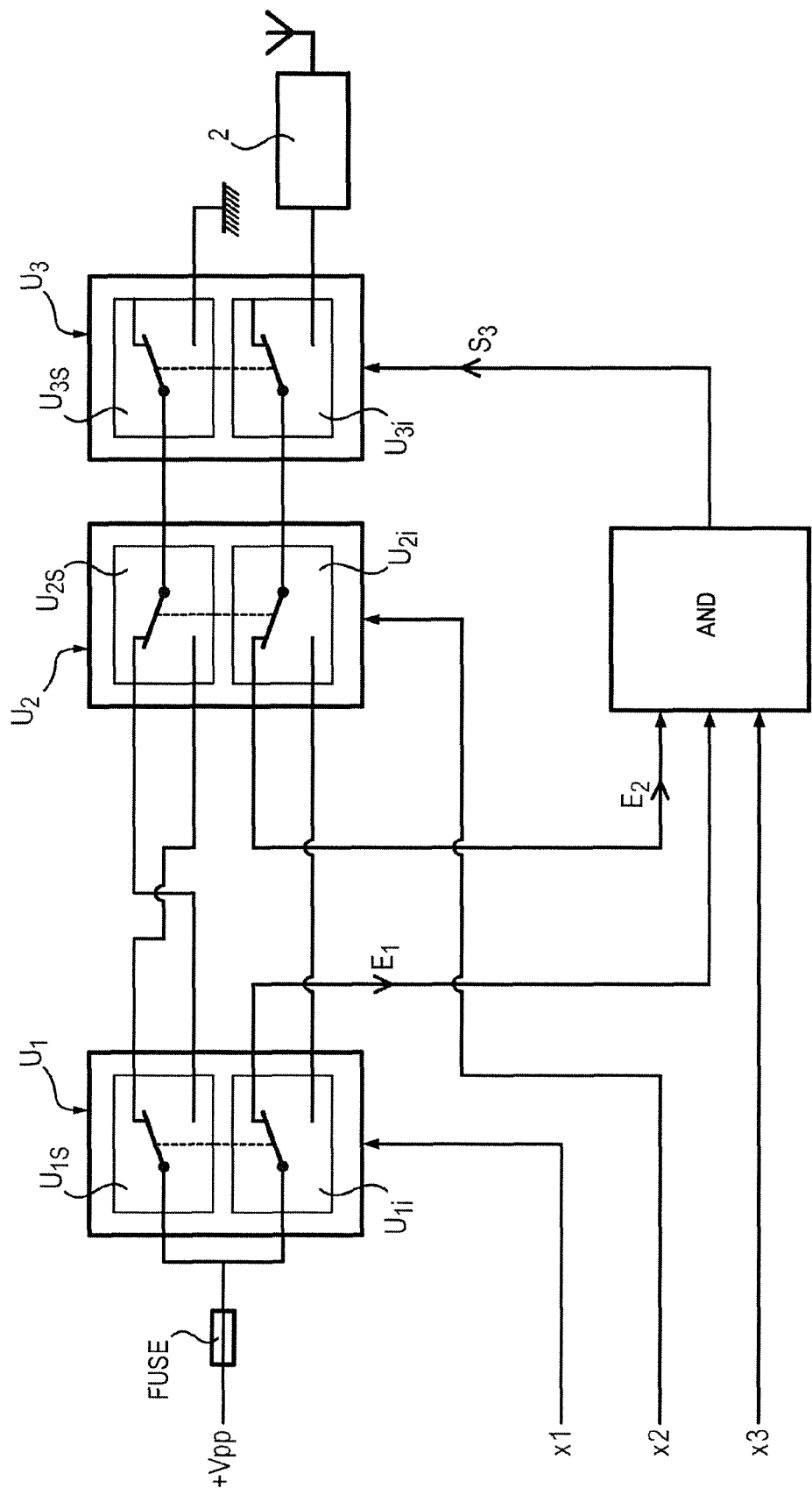
FIG. 2 illustrates a scheme diagram of an electric circuit in accordance with an embodiment of the invention.

In relation to FIG. 2, the electric circuit 1 receives as input at least two discrete electrical signals, preferably three discrete electrical signals $x_1$, $x_2$, $x_3$ and comprises a voltage source +Vpp. The values of the discrete electrical signals determine the power of the radio module 2. In this case, in the embodiment of FIGS. 2 and 3, the discrete electrical signals must all be equal to 1 so that the radio module 2 is power supplied.

Of course, one may consider an electric circuit receiving a higher number of discrete electrical signals.

The electric circuit enables in normal operation to supply the electrical power of the electrical equipment 2 according to the values of the discrete electrical signals.

We consider, in what follows, the logic values of the discrete electrical signals; in particular, we consider that a discrete electrical signal has a high state, that is to say a logical value '1' if it reflects a condition according to which the electrical equipment may be power supplied (for example, if the aircraft has landed) and it has a low state, that is to say a logical value '0' if it reflects a condition that the electrical equipment should not be power supplied.

In relation to FIG. 2, it is considered that the discrete electrical signals need all three to be in the high state if the electrical equipment 2 has to be power supplied.

As it will be described below, if a single component is used to test the values of the discrete signals, this latter has a probability of failure which is not negligible so that the electrical equipment is power supplied when it should not be.

To overcome this problem, the electric circuit has several stages that interact with each other. At each stage, we can prevent a component failure that has an inconsistent state with the discrete signals.

This reduces the probability to power supply the electrical equipment when it should not be.

Indeed, the probability of the circuit failure should be around $10^{-9}$ per hour of use whereas an electronic component has a probability of failure around $10^{-6}$ per hour of operation.

The electric circuit 1 includes a +Vpp voltage source which power supplies, in normal operation, the electrical equipment 2 if all discrete signals indicate that the electrical equipment should be power supplied. For example, the aircraft has landed, the discrete signals x1, x2, x3 are all in a high state ('1') if the electrical equipment 2 must be power supplied.

The electric circuit comprises N=3 cut-off units U1, U2, U3 connected in series to each other between the voltage source +Vpp and the electrical equipment 2.

A last cut-off unit $U_N$ with N=3 is connected to the electrical equipment 2.

In addition, each cut-off unit includes two paths, an upper path U$i$s and a lower path U$i$i. Each path is treated as a switch having an open or closed state. We precise that both paths of each cut-off unit operate simultaneously. More precisely, we cannot have for a same cut-off unit, an open path and the other closed.

The upper paths U1$s$, U2$s$ of the cut-off units upstream of the last cut-off unit U3, are interconnected in reverse manner. Its the same for the lower paths U1$i$, U2$i$.

However, this is not the case between the penultimate cut-off unit and the last cut-off unit.

The lower path U3$i$ of the last cut-off unit U3 is connected to the electrical equipment while the upper path U3$s$ is connected to a ground line.

In what follows the term "open state" of a cut-off unit, means the state of the cut-off unit when the switches for each path are high (as in FIG. 2).

And the term "low state" of a cut-off unit, means the state of the cut-off unit when the switches for each path are low (as in FIG. 2).

Further considering a cut-off unit switches from the open state to the closed state once the electric control signal of the cut-off unit has a "high" state.

Besides, with reference to FIG. 2, the electrical equipment is power supplied if the three cut-off units are in the closed state. The voltage spreads correctly from the voltage source +Vpp to the electrical equipment.

Each cut-off unit Uj, j=1, . . . , N−1, upstream of the last cut cut-off unit is controlled by a discrete electrical signal xj.

In this case, with reference to FIG. 2, the first cut-off unit U1 is controlled by the discrete electrical signal x1, the second cut-off unit U2 is controlled by the discrete electrical signal x2.

Regarding the last cut-off unit U3 (N=3), it is controlled as a function of the state E1, E2 of the upstream cut-off units.

If the state of a cut-off unit is closed, then it is considered that the state Ei (i=1, 2) of the cut-off unit Ui is a "high" state (logic value '1').

If the state of a cut-off unit is open, then it is considered that the state Ei (i=1, 2) of the cut-off unit Ui is a "low" state (logic value '0').

In particular, this is a control signal, logic function of the state of the upstream cut-off units of the last cut-off unit which enables control of the last cut-off unit.

And advantageously, it is a logic function 'AND' of the state of the units U1, U2 upstream of the last cut-off unit U3 that generates the electrical control signal s3 of the last cut-off unit U3.

Thus, to enable the last cut-off unit to switch from the open state to the closed state it is necessary that the upstream cut-off units U1, U2 are in the closed state.

Furthermore, given that the path U3$s$ of the last cut-off unit U3 is connected to a ground line, once the last cut-off unit U3 is in the conductive state, in case of discrepancy of the states in the upstream cut-off units, then a short circuit is generated.

Thus, the cut-off units are used to isolate the voltage source +Vpp from the electrical equipment if all discrete electrical signals are not high state ('1') and if the states of the upstream cut-off units are a divergent state then that the last power unit is in the closed state. For example, if the cut-off unit U1 is normally in an open state, the cut-off unit U2 operating normally switch to the closed state and a failure of the cut-off unit U3 causes its own closure, then the divergence of the cut-off units U1 and U2 associated with the inadvertent closure of the cut-off unit U3, cause a short circuit, thus the destruction of the fuse and therefore the overall power loss.

In order to protect the elements of the electric circuit in the event of a short circuit, the circuit includes a fuse FUSE for isolating the voltage source (+Vpp) from the circuit elements.

Thus, there is a short circuit to either of the upstream cut-off units is in the open state while the last cut-off unit is in the closed state.

Therefore, the electric circuit during normal operation without failure has in particular the following operation:
- If x1='1', x2='1', x3='1' then the cut-off units U1, U2, U3 are in the conductive state (E1=E2='1'), the electrical equipment 2 is power supplied.
- If x1='1', x2='0' then the cut-off unit U1 is in the conductive state (E1='1'), the cut-off unit U2 is on the open state (E2='0'), the cut-off unit U3 is in the open state (regardless of the state x3), the electrical equipment 2 is not power supplied.

In addition, in case of failure if the cut-off unit U3 is in the closed state while the discrete electrical signals indicate that the electrical equipment should not be power supplied (so that mistakenly S3='1') and that either cut-off units U1 or U2 are in the closed state, the other being in the open state, then there is a short circuit.

Figure 3:
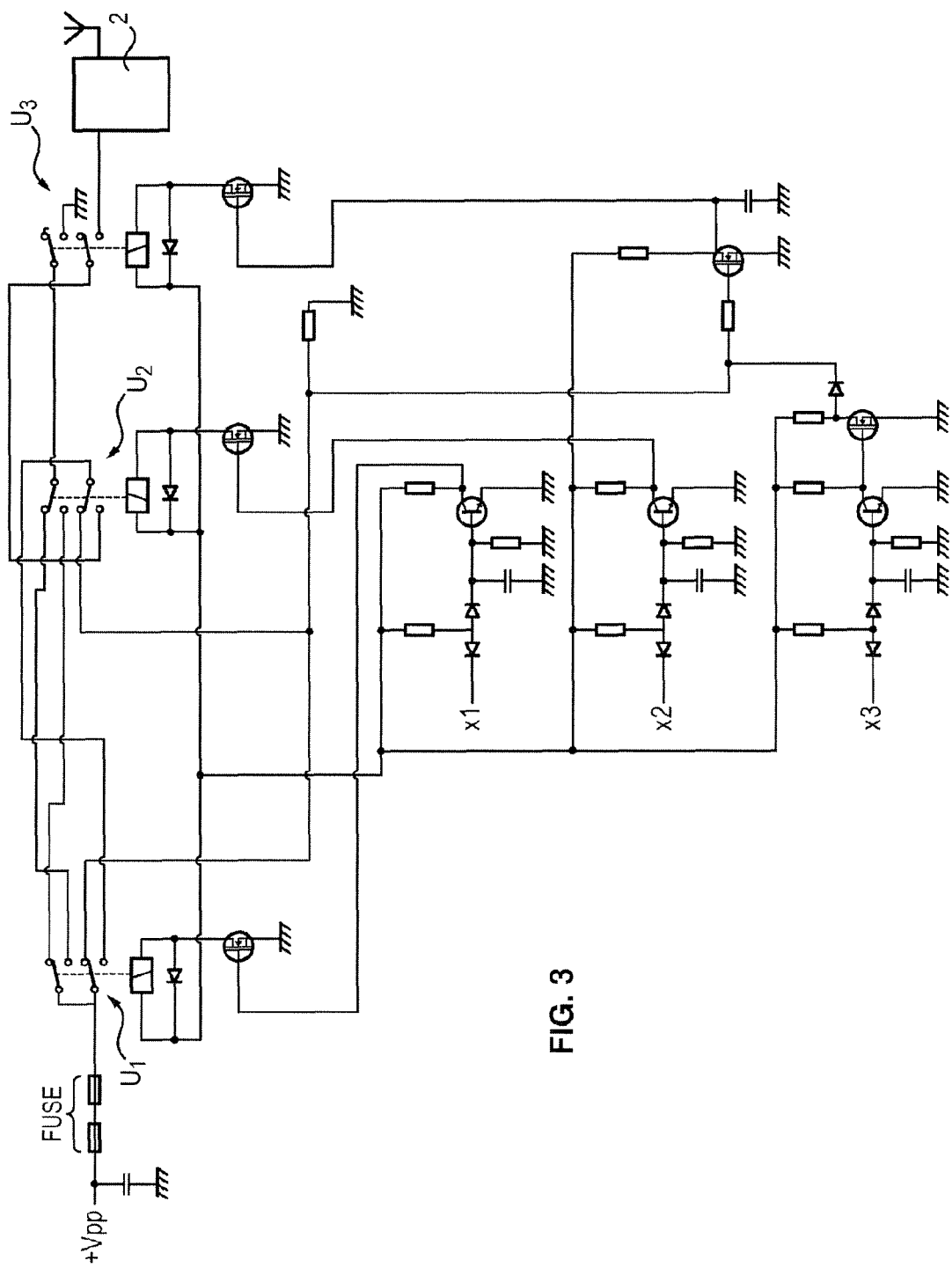
FIG. 3 illustrates a scheme diagram of an electric circuit in accordance with an embodiment of the invention.

In relation to FIG. 3, an electric circuit according to a preferred embodiment is illustrated.

As can be seen, on this figure, the cut-off units are formed by electromechanical relays. This component allows the configuration of the circuit described, reach the required level of security.

The invention claimed is:

1. An electric circuit adapted for cutting off a power supply of an electrical equipment (2), said electric circuit receiving as input at least two discrete electrical signals xi, i=1, N (x1, x2, x3), the electric circuit comprising:
   a voltage source (+Vpp);
   a number N>1 cut-off units connected Ui, i=1, ..., N (U1, U2, U3) in series to each other between the voltage source (+Vpp) and the electrical equipment, a last cut-off unit $U_N$ (U3) being connected to the electrical equipment, each cut-off unit Ui (U1, U2, U3) having an open or closed state depending on an electrical control signal (x1, x2, s3);
   the cut-off units Uj, j=1, N−1 (U1, U2) upstream of the last cut-off unit $U_N$ are each controlled by a distinct discrete electrical signal xj, j=1, ..., N−1, the last cut-off unit being controlled as a function of the state (E1, E2) of the upstream cut-off units Uj, j=1, ..., N−1 and a discrete electrical signal $X_N$ different from that controlling the upstream cut-off units Uj, j=1, N−1, the last cut-off unit being controlled to isolate the electrical equipment when the upstream cut-off units of the last cut-off unit have a divergent state.

2. The electric circuit according claim 1, wherein the last cut-off unit is adapted to generate a short circuit once said last cut-off unit is in the closed state.

3. The electric circuit according to claim 2, wherein the last cut-off unit is connected to a ground line to generate short circuit.

4. The electric circuit according to claim 3, comprising at least one fuse (FUSE) for isolating, in case of short-circuit, the voltage source (+Vpp) from the elements of said electric circuit.

5. The electric circuit according to claim 1, wherein each cut-off unit comprises an upper path and a lower path, each path comprising a switch having an "open" state or a "closed" state.

6. The electric circuit according to claim 1, wherein the upper paths of the cut-off units upstream of the last cut-off unit are connected reversely.

7. The electric circuit according to claim 1, wherein the cut-off units are electromechanical relays.

8. The electric circuit according to claim 1, wherein the last cut-off unit is controlled by a logic function AND of the state of the upstream cut-off units and by the control signal of the $N^{th}$ cut-off unit.

9. An avionic data acquisition, processing and communication system comprising a radio module (2) comprising a power supply connected to an electric circuit (1), according to claim 1.

* * * * *